United States Patent
Su et al.

(10) Patent No.: US 12,258,000 B2
(45) Date of Patent: Mar. 25, 2025

(54) HYBRID POWER SYSTEM AND ENERGY MANAGEMENT OPTIMIZATION METHOD THEREOF

(71) Applicant: APh ePower Co., Ltd., Kaohsiung (TW)

(72) Inventors: Hsiu-Hsien Su, Kaohsiung (TW); Chien-Hsun Wu, Kaohsiung (TW); Shang-Zeng Huang, Kaohsiung (TW)

(73) Assignee: APh ePower Co., Ltd., Kaohsiung (TW)

( * ) Notice: Subject to any disclaimer, the term of this patent is extended or adjusted under 35 U.S.C. 154(b) by 0 days.

(21) Appl. No.: 18/633,542

(22) Filed: Apr. 12, 2024

(65) Prior Publication Data
US 2024/0375638 A1 Nov. 14, 2024

(30) Foreign Application Priority Data
May 8, 2023 (TW) ................. 112116969

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01)

(58) Field of Classification Search
CPC ....... B60W 20/15; B60W 10/06; B60W 10/08
See application file for complete search history.

(56) References Cited

U.S. PATENT DOCUMENTS

| 9,184,686 B2 | 11/2015 | Minamiguchi et al. |
| 11,489,476 B2 | 11/2022 | Ha et al. |
| 2009/0150016 A1* | 6/2009 | Hung .................... B60W 10/06 903/905 |

(Continued)

FOREIGN PATENT DOCUMENTS

| CN | 110962837 A | * | 4/2020 | |
| CN | 109849897 B | * | 7/2020 | |
| CN | 111391644 A | * | 7/2020 | ............... B60K 6/26 |

(Continued)

OTHER PUBLICATIONS

Kuen-Bao Sheu, "Simulation for the analysis of a hybrid electric scooter powertrain", Applied Energy, Nov. 13, 2007, pp. 589-606, vol. 85.

(Continued)

*Primary Examiner* — Stacey A Fluhart
(74) *Attorney, Agent, or Firm* — JCIPRNET

(57) ABSTRACT

Disclosed is a hybrid power system including a computing core, a power converter, a driving motor, an engine generator, a charging stand, and a battery pack. The power converter is coupled to the computing core. The driving motor is coupled to the power converter. The engine generator is coupled to the power converter. The charging stand is coupled to the power converter. The battery pack is coupled to the power converter. When inputting a required torque to the computing core and switching to a charging mode, an electric energy source is coupled to the charging stand and provides power to the battery pack through the power converter. The computing core executes an optimal power allocation algorithm.

16 Claims, 3 Drawing Sheets

(56) References Cited

U.S. PATENT DOCUMENTS

2016/0089986 A1* 3/2016 Maeno .................. B60L 58/12
320/101
2020/0398813 A1 12/2020 Hung et al.

FOREIGN PATENT DOCUMENTS

| | | |
|---|---|---|
| CN | 115857463 | 3/2023 |
| EP | 2660581 | 11/2013 |
| JP | 2000035380 | 2/2000 |
| KR | 20120100372 | 9/2012 |

OTHER PUBLICATIONS

Sheng-Chung Tzeng et al., "Optimization of the dual energy-integration mechanism in a parallel-type hybrid vehicle", Applied Energy, Jul. 28, 2004, pp. 225-245, vol. 80.

O. Erdinc et al., "A wavelet-fuzzy logic based energy management strategy for a fuel cell/battery/ultra-capacitor hybrid vehicular power system", Journal of Power Sources, May 3, 2009, pp. 369-380, vol. 194.

Tomaž Katrašnik, "Analytical method to evaluate fuel consumption of hybrid electric vehicles at balanced energy content of the electric storage devices", Applied Energy, Jul. 6, 2010, pp. 3330-3339, vol. 87.

Wei Xu et al., "Torque optimization control for electric vehicles with four in-wheel motors equipped with regenerative braking system", Mechatronics, Dec. 10, 2018, pp. 95-108, vol. 57.

Yi-Hsuan Hung et al. "A combined optimal sizing and energy management approach for hybrid in-wheel motors of EVs", Applied Energy, Dec. 10, 2014, pp. 260-271, vol. 139.

Ari Hentunen et al., "Hardware-in-the-Loop Verification Environment for Heavy-Duty Hybrid Electric Vehicles", 2010 IEEE Vehicle Power and Propulsion Conference, Sep. 1, 2010, pp. 1-6.

Andres Sierra et al., "Experimental Validation of an Optimal Energy Management Strategy for a Hybrid Bus with Dual Storage System", 2017 IEEE Vehicle Power and Propulsion Conference (VPPC), Dec. 11, 2017, pp. 1-6.

David Bouquain et al., "HEV series architectures evaluation: modeling, simulation and experimentation", 2009 IEEE Vehicle Power and Propulsion Conference, Sep. 7, 2009, pp. 584-591.

"Search Report of Europe Counterpart Application", issued on Oct. 22, 2024, p. 1-p. 9.

* cited by examiner

HYBRID POWER SYSTEM AND ENERGY MANAGEMENT OPTIMIZATION METHOD THEREOF

CROSS-REFERENCE TO RELATED APPLICATION

This application claims the priority benefit of Taiwan application serial no. 112116969, filed on May 8, 2023. The entirety of the above-mentioned patent application is hereby incorporated by reference herein and made a part of this specification.

BACKGROUND

Technical Field

The disclosure relates to a dynamic force system, and in particular, to a hybrid power system that adopts an optimal power allocation algorithm.

Description of Related Art

In previous studies, the optimization of hybrid power systems mainly aims at saving energy and reducing costs, thereby achieving higher overall efficiency and improving the overall dynamic force of the system. Thus, the energy management strategy and the design of the power/dynamic force system are the two main factors for consideration. Hybrid power systems are mainly applied to automobiles. A pure electric mode may be used for existing plug-in hybrid electric vehicles in short-distance driving to enjoy the driving experience of an electric vehicle. For longer distances, the existing plug-in hybrid electric vehicles can be switched to a gasoline-electric mode to be provided with an endurance for long-distance driving, and range anxiety can be avoided. However, the existing hybrid electric vehicles combine two driving approaches, that is, electric motors and fuel engines, which makes the dynamic force transmission system more complex in design.

SUMMARY

The disclosure provides a hybrid power system that combines a storage battery and an engine generator to supply power to a motor and, when in a charging mode, executes an optimal power allocation algorithm to calculate a minimum power consumption.

A hybrid power system of the disclosure includes a computing core, a power converter, a driving motor, an engine generator, a charging stand, and a battery pack. The power converter is coupled to the computing core. The driving motor is coupled to the power converter. The engine generator is coupled to the power converter. The charging stand is coupled to the power converter. The battery pack is coupled to the power converter. When inputting a required torque to the computing core and switching to a charging mode, an electric energy source is coupled to the charging stand and provides power to the battery pack through the power converter. The computing core executes an optimal power allocation algorithm.

In an embodiment of the disclosure, the power converter executes an optimal power allocation algorithm, and the engine generator and/or the battery pack provide power to the driving motor to generate a dynamic force in case of inputting the required torque to the computing core and switching to a driving mode.

An energy management optimization method of the hybrid power system of the disclosure includes a computing core, a power converter, a driving motor, an engine generator, a charging stand, and a battery pack. The power converter is coupled to the computing core. The driving motor is coupled to the power converter. The engine generator is coupled to the power converter. The charging stand is coupled to the power converter. The battery pack is coupled to the power converter. The energy management optimization method includes the following steps. In case of a required torque detected by the computing core being 0, the hybrid power system is switched to a standby mode. In case of the hybrid power system being switched to a charging mode, a required torque is input to the computing core and determined whether the required torque is greater than 0. The hybrid power system is switched to the standby mode in response to a negative result, and the computing core of the hybrid power system executes an optimal power allocation algorithm in response to a positive result.

In an embodiment of the disclosure, the power converter executes an optimal power allocation algorithm, and the engine generator and/or the battery pack provide power to the driving motor to generate a dynamic force in case of inputting the required torque to the computing core and switching to a driving mode.

Based on the above, the hybrid power system of the disclosure is applicable to a vehicle carrier, and the hybrid power system has an engine generator, a driving motor, and a battery pack. The engine generator is only used to provide power to the battery pack, and then the power from the battery pack is output to the driving motor through a power converter to generate a dynamic force. Since the only source of dynamic force generation is the driving motor, a dynamic force level may be controlled by adjusting a current value input to the driving motor. In comparison with existing hybrid electric vehicles, equipping the engine generator with a transmission and a dynamic force transmission system is not required. Thus, an installation position of the engine generator in the vehicle carrier is relatively flexible. In addition, the engine generator of the disclosure operates only for electricity generation. Thus, controlling a sewage discharge level of the engine generator is less challenging.

Further, the hybrid power system of the disclosure adopts the optimal power allocation algorithm in the driving mode to achieve an optimal energy consumption allocation in a dual power structure consisting of the engine generator and the battery pack, thereby improving an operational endurance of the hybrid power system.

DESCRIPTION OF THE EMBODIMENTS

Figure 1:
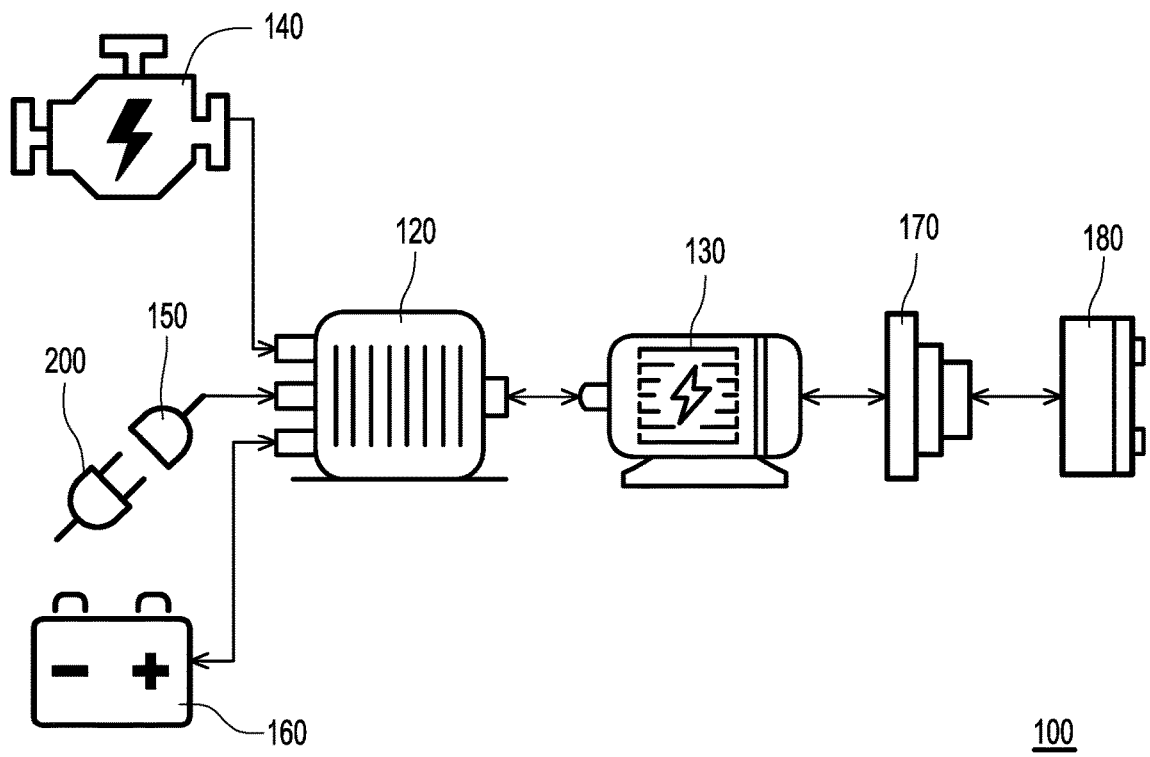
FIG. 1 is a structural schematic diagram of a hybrid power system in an embodiment of the disclosure.
Figure 2:
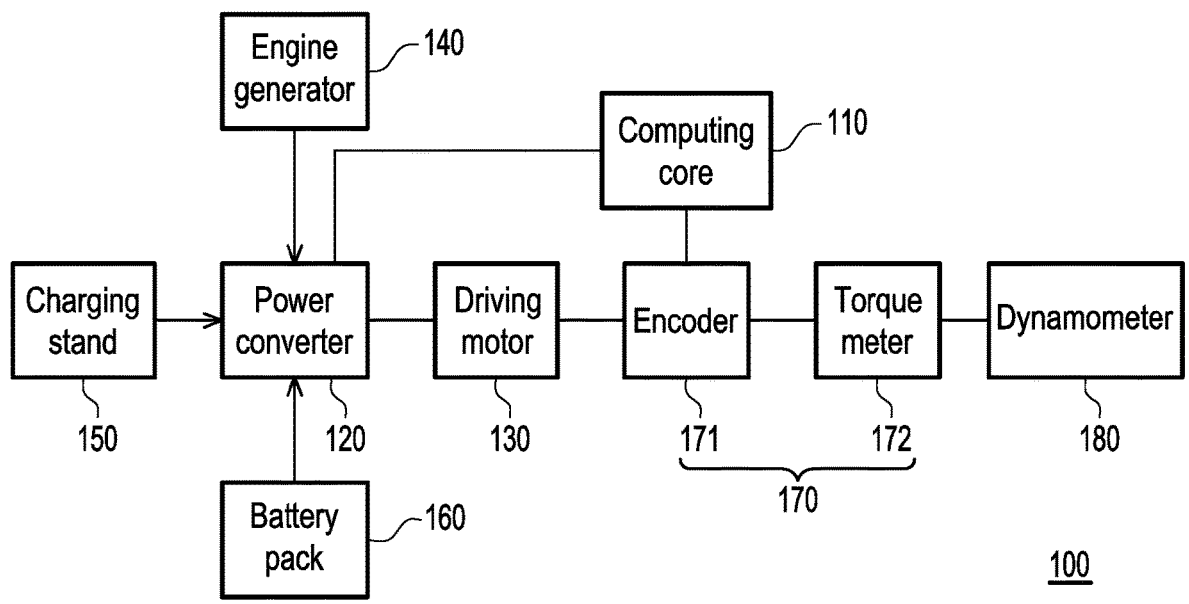
FIG. 2 is a block schematic diagram of the hybrid power system in FIG. 1.
Figure 3:
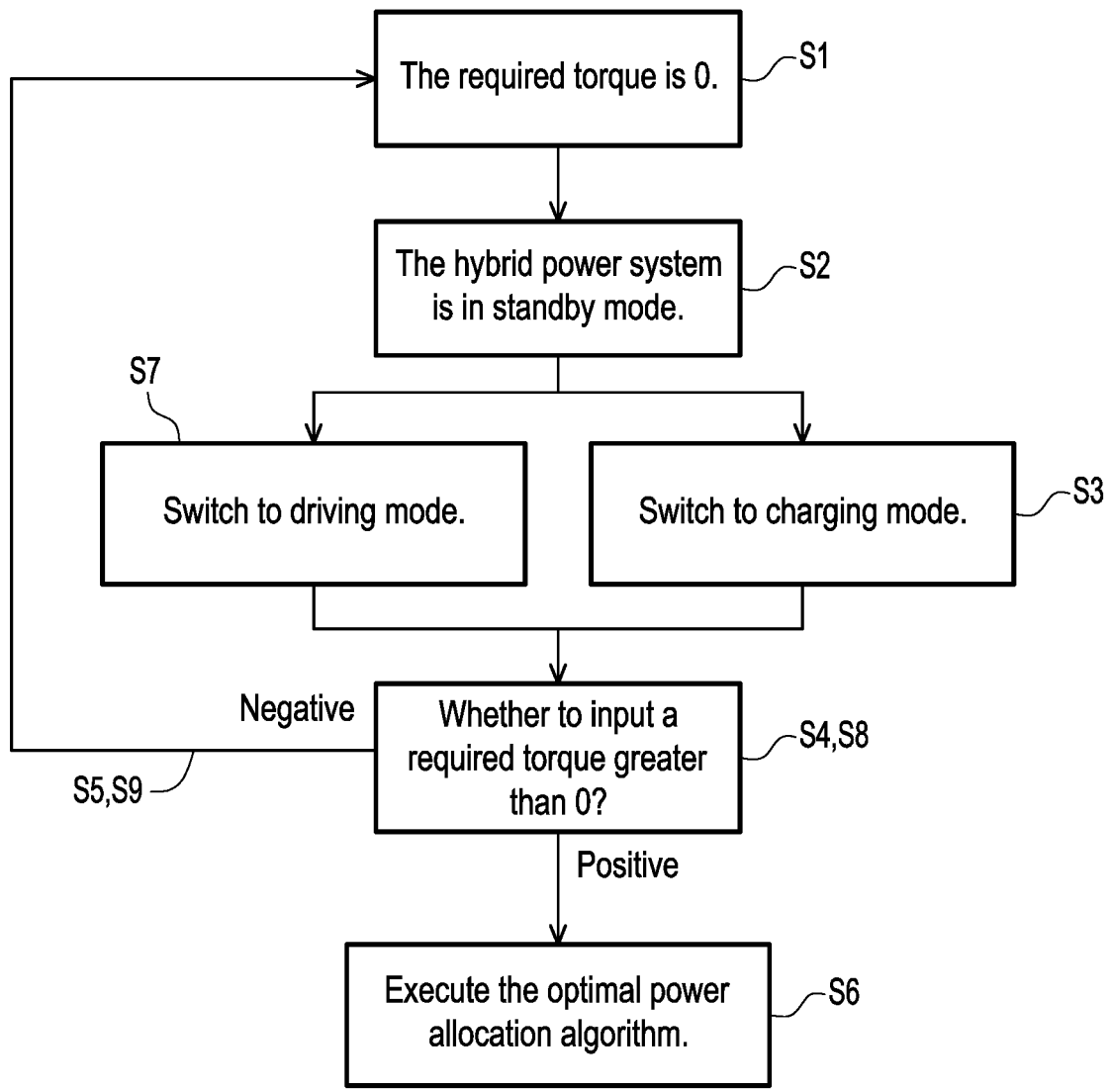
FIG. 3 is a flowchart of a dual mode optimal power allocation algorithm of the hybrid power system in FIG. 2.

FIG. 1 is a structural schematic diagram of a hybrid power system in an embodiment of the disclosure. FIG. 2 is a block schematic diagram of the hybrid power system in FIG. 1. FIG. 3 is a flowchart of an optimization method of the hybrid power system in FIG. 2.

Referring to FIGS. 1 to 3, a hybrid power system 100 of the disclosure includes a computing core 110, a power converter 120, a driving motor 130, an engine generator 140, a charging stand 150, and a battery pack 160.

The computing core 110 is, for example, a processor unit of a vehicle carrier and is used to receive signals from various sensors of the vehicle carrier to determine the operation status of the vehicle carrier. The computing core 110 is also used to switch to different modes corresponding with various operation statuses according to a built-in program, thereby fulfilling the objective of the hybrid power system 100 automatically switching between different modes.

The power converter 120 is coupled to the computing core 110. The engine generator 140 is coupled to the power converter 120. The driving motor 130 is coupled to the power converter 120. The charging stand 150 is coupled to the power converter 120. For example, when the vehicle carrier is parked at a charging station, an external electric energy source 200 is coupled to the charging stand 150 for charging. The battery pack 160 is coupled to the power converter 120, wherein the battery pack 160 includes rechargeable batteries and adopts lead-acid batteries, nickel-metal hydride batteries, lithium-ion batteries, aluminum batteries, or fuel cells.

In addition, the battery pack 160 includes multiple battery units. When a charge capacity of one of the battery units is lower than a preset value, the discharging of the battery unit is stopped, and the battery unit is succeeded by another one of the battery units that has a charge capacity greater than the preset value for discharging so as to maintain power output.

Referring to FIGS. 1 to 3, when inputting a required torque to the computing core 110 and switching to a charging mode, an electric energy source 200 is coupled to the charging stand 150 and provides power to the battery pack 160 through the power converter 120 to achieve the charging of the battery pack 160. The computing core 110 executes an optimal power allocation algorithm.

Specifically, the power converter 120 of the disclosure has a multi-input single-output structure. "Multi-input" refers to multiple power input ends, and "single-output" refers to one power output end. The power converter 120, in response to the charging actions of the charging stand 150 and the electric energy source 200, realizes the optimal charging control of the battery pack 160 and the charging stand 150 through the optimal power allocation algorithm so as to reduce charging time and achieve the objective of energy saving.

Referring to FIGS. 1 to 3, in an embodiment of the disclosure, the computing core 110 executes an optimal power allocation algorithm, and the engine generator 140 and/or the battery pack 160 provide power to the driving motor 130 to generate a dynamic force in case of inputting the required torque to the computing core 110 and switching to a driving mode.

With reference to FIGS. 1 and 2, a deceleration mechanism 170 and a dynamometer 180 are further included. The deceleration mechanism 170 is connected to the driving motor 130, and the dynamometer 180 is connected to the deceleration mechanism 170. The deceleration mechanism 170 and the dynamometer 180 serve as load simulators, and the load sizes of the deceleration mechanism 170 and the dynamometer 180 are adjusted by controlling the supplied current so as to simulate the weight of the vehicle carrier and the friction resistance generated when driving or the gradient resistance when climbing a slope. This facilitates the improvement of the simulation accuracy of the hybrid power system 100 in executing the optimal power allocation algorithm.

The deceleration mechanism 170 further includes an encoder 171 and a torque meter 172. The encoder 171 is connected to the driving motor 130 and used to measure the rotational speed of the driving motor 130 and feedback a signal to the computing core 110. The torque meter 172 is connected between the encoder 171 and the dynamometer 180, and feedbacks a torque value of the driving motor 130 to the computing core 110.

The computing core 110 is adaptable to receive signal values from the encoder 171 and the torque meter 172, thereby dynamically adjusting the energy output ratio of the engine generator 140 and the battery pack 160 so as to achieve the objective of minimizing energy consumption.

Referring to FIGS. 1 to 3, an energy management optimization method of the hybrid power system 100 of the disclosure includes the following steps. In Step S1, the computing core 110 detects the required torque being 0, i.e., the hybrid power system 100 is not activated. In Step S2, the computing core 110 switches the hybrid power system 100 to a standby mode. In Step S3, when the hybrid power system 100 is switched to the charging mode, inputting a required torque to the computing core 110 first. In Step S4, the computing core 110 determines whether the required torque is greater than 0. In Step S5, the hybrid power system 100 is switched to the standby mode in response to a negative result. In Step S6, the computing core 110 of the hybrid power system 100 executes an optimal power allocation algorithm in response to a positive result.

Figure 4:
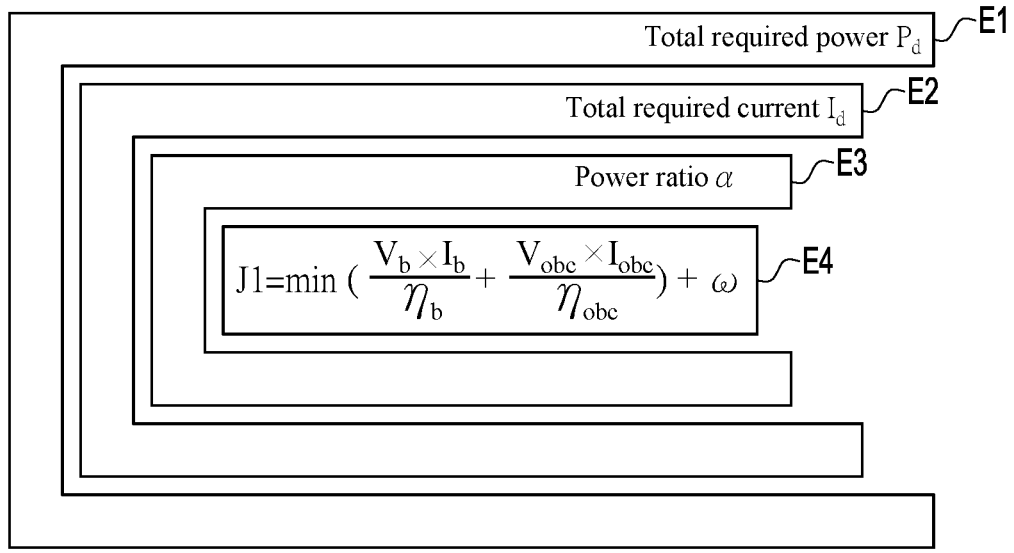
FIG. 4 is a schematic diagram of a four-loop calculation of the optimal power allocation algorithm of the hybrid power system in FIG. 3 in a charging mode.

FIG. 4 is a schematic diagram of a four-loop calculation of the optimal power allocation algorithm of the hybrid power system in FIG. 3 in a charging mode.

With reference to FIGS. 1 to 4, the optimal power allocation algorithm establishes a four-loop formula and conducts a global search for a first loop E1 (a total required power Pd), a second loop E2 (a total required current Id), a third loop E3 (a power ratio $\alpha$), and a fourth loop E4 (a minimum power consumption J1), for example, the search range of the total demand power Pd is 100 kW to 500 kW, the search range of the required current Id is 1 A to 48A, and the search range of the power ratio $\alpha$ is 0 to 1, and further uses a global grid search method to calculate multiple minimum power consumption J1 of all conditions and outputs a multi-dimensional table.

Specifically, an efficiency optimization method of the hybrid power system 100 applies the global grid search (GGS) theory to obtain an optimal power ratio (PR). Thus, the power consumed by the hybrid power system 100 is used for comparison to obtain the optimal power allocation algorithm of the hybrid power system 100. By using a target function program and a computing result from an optimal global search, a power ratio ($\alpha$) of the battery pack 160 and a power ratio (1-$\alpha$) of the charging stand 150 are thereby derived.

Referring to FIG. 4, a function of the minimum power consumption is defined as $J1=\min[V_b*I_b/\eta_b+V_{obc}*I_{obc}/\eta_{obc}]+\omega$, $V_b$ is an output voltage of the battery pack 160. $V_{obc}$ is an output voltage of the charging stand 150. It is an output current of the battery pack 160. $I_{obc}$ is an output current of the charging stand 150. $\eta_b$ is a charging efficiency of the battery pack 160. $\eta_{obc}$ is a charging efficiency of the charging stand 150, and $\omega$ is a penalty value for the state of charge SOC of the battery pack 160. When the conditions of the grid search exceed a physical limit, i.e., the total required power of the battery pack 160 and the charging stand 150, a penalty value ω is given so that the calculated minimum power consumption J1 generates a maximum. This best value result is not adopted by the computing core 110.

For example, a search range of the output voltage $V_b$ of the battery pack 160 is 1V to 48V. A search range of the output voltage $V_{obc}$ of the charging stand 150 is 1V to 48V. In terms of the charging efficiency $\eta_{obc}$ of the charging stand 150 and the charging efficiency $\eta_b$ of the battery pack 160, a search range of the charging efficiency $\eta_b$ is 1% to 50%. Multiple minimum power consumption J1 of all conditions are calculated using the global grid search, and multi-dimensional table is output. The established multi-dimensional table is embedded into an energy management system. Parameters of the required power $P_d$, the required current $I_d$, and the power ratio α of all conditions are input in order to find out an array of all minimum power consumption J1 at the moment. Then, the relationship, to which a minimum power consumption J1 in the array corresponds, between the output power of the battery pack 160 and the output power of the engine generator 140 and the charging efficiencies $\eta_{obc}$ and $\eta_b$ is to be found.

Referring to FIGS. 1 to 4, an array of values of the corresponding minimum power consumption J1 is obtained by inputting particular values of the total required power $P_d$, the total required current $I_d$, and the power ratio a to the multi-dimensional table so as to find an optimal power ratio α in the array of values. In addition, when computing under different operating conditions (i.e., different total required power $P_d$, total required current $I_d$, and power ratio α), a function of the minimum power consumption J1 may be obtained through the integration of all minimum power consumption of the hybrid power system 100. The function is a two-dimensional-table formula for the optimal power ratio α: J1*(a,b)=min J1(a,b,c). Through the two-dimensional-table formula for the optimal power ratio α, a multi-dimensional table may be produced, which may be directly imported into a controller of the vehicle carrier for charging optimization and energy management, thereby achieving the effect of minimizing the charging power consumption and reducing charging time.

Referring to FIGS. 1 to 3, the energy management optimization method of the hybrid power system 100 of the disclosure includes the following steps. In Step S1, the computing core 110 detects the required torque being 0, i.e., the hybrid power system 100 is not activated. In Step S2, the computing core 110 switches the hybrid power system 100 to the standby mode. In Step S7, when the hybrid power system 100 is switched to the driving mode, a required torque is first input to the computing core 110. In Step S8, the computing core 110 determines whether the required torque is greater than 0. In Step S9, the hybrid power system 100 is switched to the standby mode in response to a negative result, and the computing core 110 of the hybrid power system 100 executes the optimal power allocation algorithm in response to a positive result.

In short, when a charge capacity of the battery pack 160 is greater than a preset value, the engine generator 140 is not activated and the battery pack 160 is continuously discharged to the driving motor 130. When the charge capacity of the battery pack 160 is less than a preset value, the engine generator 140 is activated, and the battery pack 160 is charged through the power converter 120. Further, the battery pack 160 is continuously discharged to the driving motor 130, thereby performing an optimal deployment of electric energy supply to improve the endurance of the vehicle for driving.

Figure 5:
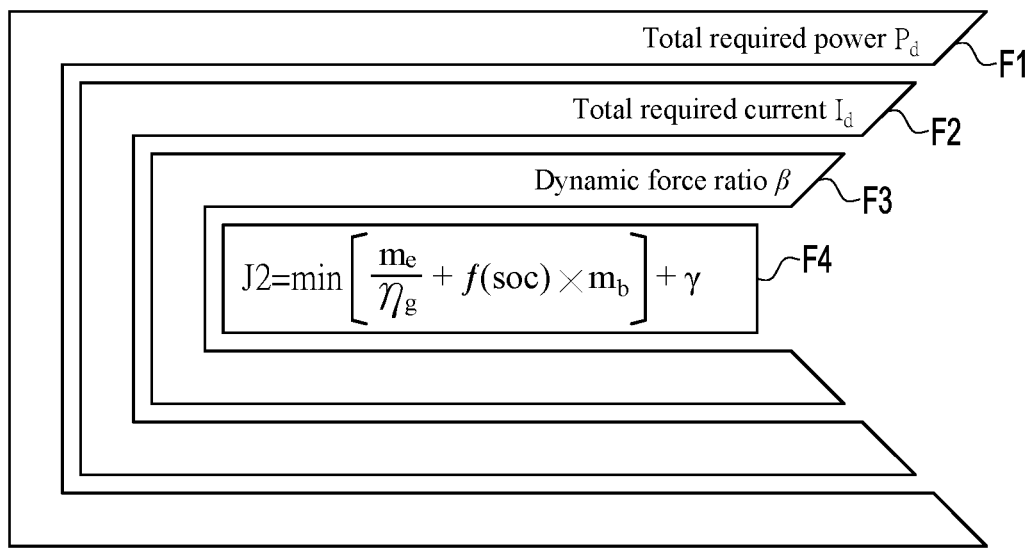
FIG. 5 is a schematic diagram of a four-loop calculation of the optimal power allocation algorithm of the hybrid power system in FIG. 3 in a driving mode.

FIG. 5 is a schematic diagram of a four-loop calculation of the optimal power allocation algorithm of the hybrid power system in FIG. 3 in a driving mode.

Referring to FIGS. 1, 2, 3, and 5, when the computing core 110 executes the optimal power allocation algorithm, a four-loop formula is established, with a first loop F1 being the required power $P_d$, a second loop F2 being the total required current $I_d$, a third loop F3 being a dynamic force ratio B, and a fourth loop F4 being a function of the minimum equivalent consumption, wherein the function of the minimum equivalent consumption is defined as J2=min $[m_e/\eta_g+f(SOC)*m_b]+\gamma$.

Specifically, me is an actual fuel consumption of the engine generator 140. $\eta_g$ is a generator efficiency of the engine generator 140. $m_b$ is an equivalent fuel consumption of the battery pack 160, and f(SOC) is a weight of a battery charging state. The optimal power allocation algorithm utilizes an equation, i.e. the target function, to present a fuel consumption of the whole vehicle as the equivalent fuel consumption. The steps of an algorithm concerning an equivalent consumption minimization strategy (ECMS) are provided below.

As shown in FIG. 5, a global search is conducted for the discretized total required power Pd, the total require current Id, and the dynamic force ratio β. For example, the search range of the total required power Pd is 100 kW to 500 kW, the search range of the total require current Id is 1 A to 48A, and the search range of the dynamic force ratio β is 0 to 1. Finally, the equivalent fuel consumption of all conditions is calculated with the global grid search method in an off-line environment, and a multi-dimensional table of the equivalent fuel consumption is established. The established multi-dimensional table is embedded into the energy management system. An array of all equivalent fuel consumption at the moment is found out according to conditions concerning parameters input at the moment, wherein the parameters include the required power Pd, the required current Id, and the dynamic force ratio β. Then, the relationship, to which a minimum equivalent fuel consumption in the array corresponds, between the output power of the battery pack 160 and the output power of the engine generator 140 and the current is to be found.

In summary, the hybrid power system of the disclosure is applicable to a vehicle carrier, and the hybrid power system has an engine generator, a driving motor, and a battery pack. The engine generator is only used to provide power to the battery pack, and then the power from the battery pack is output to the driving motor through a power converter to generate a dynamic force. Since the only source of dynamic force generation is the driving motor, a dynamic force level may be controlled by adjusting a current value input to the driving motor. In comparison with existing hybrid electric vehicles, equipping the engine generator with a transmission and a dynamic force transmission system is not required. Thus, an installation position of the engine generator in the vehicle carrier is relatively flexible. In addition, the engine generator of the disclosure operates only for electricity generation. Thus, controlling a sewage discharge level of the engine generator is less challenging.

The hybrid power system of the disclosure, when in the charging mode, is charged through the battery pack and the charging stand via the power converter. The hybrid power system also obtains the optimal power ratio in the charging mode through the global grid search theory, thereby achieving the objective of minimizing the charging power consumption and reducing charging time.

Further, the hybrid power system of the disclosure adopts the optimal power allocation algorithm in the driving mode to achieve an optimal energy consumption allocation in a dual power structure consisting of the engine generator and the battery pack, thereby improving an operational endurance of the hybrid power system. The operational endurance of the hybrid power system is also improved by enabling the hybrid power system to automatically deploy the dual power output ratio of the engine generator and the battery pack through the optimal power allocation algorithm, further avoiding damage and safety problems resulted from overcharge and overdischarge of the battery pack.

What is claimed is:

1. A hybrid power system, comprising:
a computing core;
a power converter, coupled to the computing core;
a driving motor, coupled to the power converter;
an engine generator, coupled to the power converter;
a charging stand, coupled to the power converter; and
a battery pack, coupled to the power converter,
wherein an electric energy source is coupled to the charging stand and provides power to the battery pack through the power converter in case of inputting a required torque to the computing core and switching to a charging mode, wherein the computing core executes an optimal power allocation algorithm,
wherein the optimal power allocation algorithm establishes a four-loop formula and conducts a global search for a total required power, a total required current, and a power ratio, further using a global grid search method to calculate a plurality of minimum power consumption of all conditions and outputting a multi-dimensional table.

2. The hybrid power system of claim 1, wherein a function of the minimum power consumption is defined as $J1=\min[Vb*Ib/\eta b+Vobc*Iobc/\eta obc]+\omega$.

3. The hybrid power system of claim 2, wherein an array of values of the corresponding minimum power consumption is obtained by inputting particular values of the total required power, the total required current, and the power ratio to the multi-dimensional table so as to find an optimal power ratio in the array of values.

4. The hybrid power system of claim 1, wherein the computing core executes the optimal power allocation algorithm and the engine generator and/or the battery pack provide power to the driving motor to generate a dynamic force in case of inputting the required torque to the power converter and switching to a driving mode.

5. The hybrid power system of claim 4, wherein the optimal power allocation algorithm establishes a four-loop formula and conducts a global search for a total required power, a total required current, and a dynamic force ratio to calculate a minimum equivalent consumption and establish a multi-dimensional table with the minimum equivalent consumption.

6. The hybrid power system of claim 5, wherein a function of the minimum equivalent consumption is defined as $J2=\min[me/\eta g+f(SOC)*mb]+\gamma$.

7. The hybrid power system of claim 6, wherein a corresponding parameter is input to the multi-dimensional table, and an array of all minimum equivalent consumption is found out according to input conditions of the total required power, the total required current, and the dynamic force ratio so as to find a relationship, to which each of the minimum equivalent consumption in the array corresponds, between an output power of the battery pack and an output power of the engine generator and a current.

8. The hybrid power system of claim 1, further comprising a deceleration mechanism and a dynamometer, wherein the deceleration mechanism comprises an encoder and a torque meter, wherein the encoder is connected to the driving motor to measure a rotational speed of the driving motor and feedback a signal to the computing core, wherein the torque meter is connected between the encoder and the dynamometer and feedbacks a torque value to the computing core.

9. An energy management optimization method of a hybrid power system, comprising:
a computing core;
a power converter, coupled to the computing core;
a driving motor, coupled to the power converter;
an engine generator, coupled to the power converter;
a charging stand, coupled to the power converter; and
a battery pack, coupled to the power converter, wherein the energy management optimization method comprises:
in case of a required torque detected by the computing core being 0, switching the hybrid power system to a standby mode;
in case of the hybrid power system being switched to a charging mode,
inputting a required torque to the computing core and determining whether the required torque is greater than 0, wherein
when the required torque is 0, the hybrid power system is switched to the standby mode; and
when the required torque is greater than 0, the computing core of the hybrid power system executes an optimal power allocation algorithm,
wherein the optimal power allocation algorithm establishes a four-loop formula and conducts a global search for a total required power, a total required current, and a power ratio, further using a global grid search method to calculate a plurality of minimum power consumption of all conditions and outputting a multi-dimensional table.

10. The energy management optimization method of claim 9, wherein a function of the minimum power consumption is defined as $J1=\min[Vb*Ib/\eta b+Vobc*Iobc/\eta obc]+\omega$.

11. The energy management optimization method of claim 10, wherein an array of values of the corresponding minimum power consumption is obtained by inputting particular values of the total required power, the total required current, and the power ratio to the multi-dimensional table so as to find an optimal power ratio in the array of values.

12. The energy management optimization method of claim 9, wherein
in case of the hybrid power system being switched to a driving mode,
the required torque is input to the computing core and determined whether the required torque is greater than 0, wherein
when the required torque is 0, the hybrid power system is switched to the standby mode; and
when the required torque is greater than 0, the computing core of the hybrid power system executes the optimal power allocation algorithm.

13. The energy management optimization method of claim 12, wherein the engine generator and/or the battery pack provide power to the driving motor to generate a dynamic force.

14. The energy management optimization method of claim 12, wherein the optimal power allocation algorithm establishes a four-loop formula and conducts a global search for a total required power, a total required current, and a dynamic force ratio to calculate a minimum equivalent consumption and establish a multi-dimensional table with the minimum equivalent consumption.

15. The energy management optimization method of claim 14, wherein a function of the minimum equivalent consumption is defined as $J2=\min[me/\eta g+f(SOC)*mb]+\gamma$.

16. The energy management optimization method of claim 15, wherein a corresponding parameter is input to the multi-dimensional table, and an array of all minimum equivalent consumption is found out according to input conditions of the total required power, the total required current, and the dynamic force ratio so as to find a relationship, to which each of the minimum equivalent consumption in the array corresponds, between an output power of the battery pack and an output power of the engine generator and a current.

* * * * *